March 2, 1937. C. N. POGUE 2,072,277
AEROPLANE
Filed March 2, 1935 3 Sheets-Sheet 1
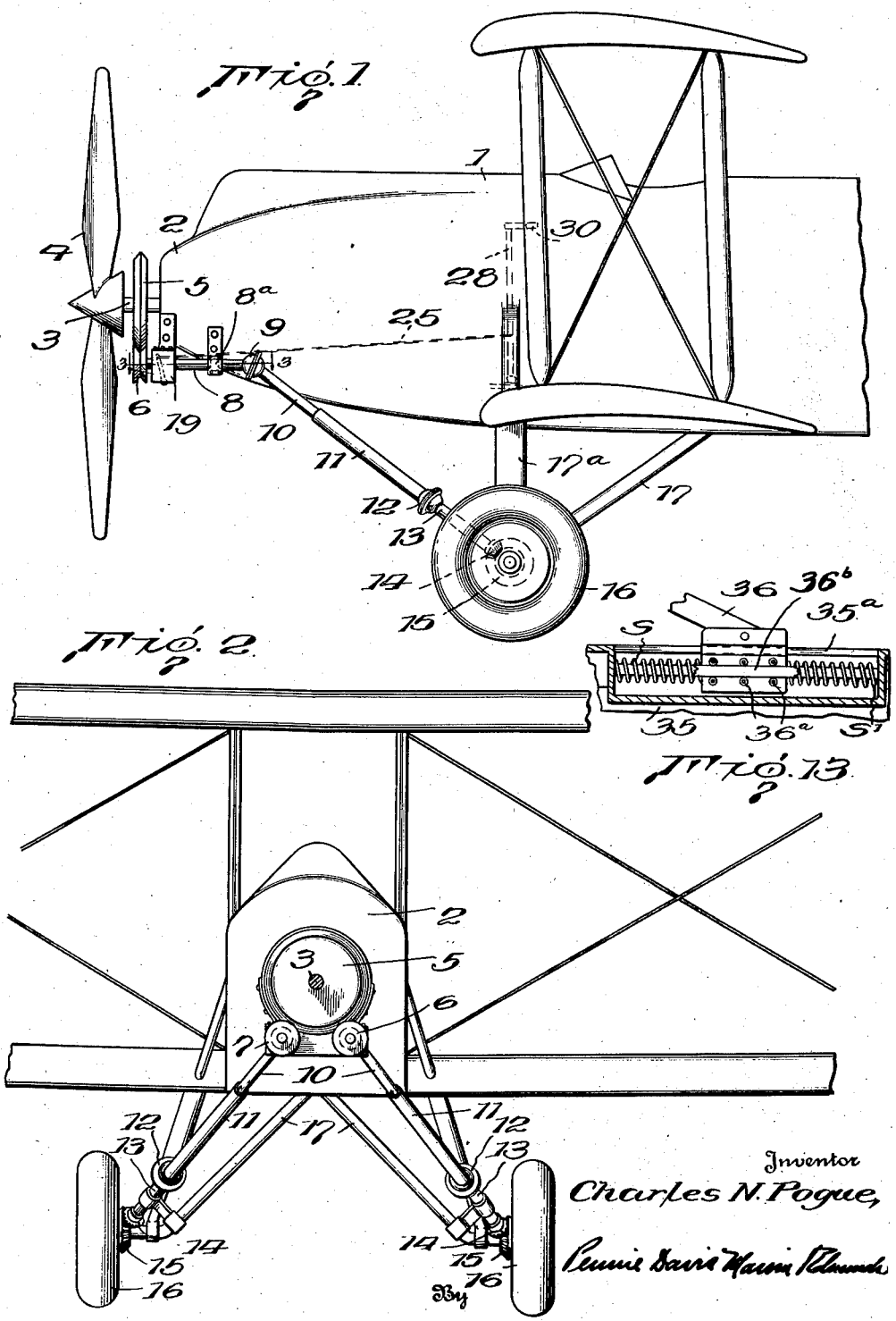

March 2, 1937. C. N. POGUE 2,072,277
AEROPLANE
Filed March 2, 1935 3 Sheets-Sheet 2
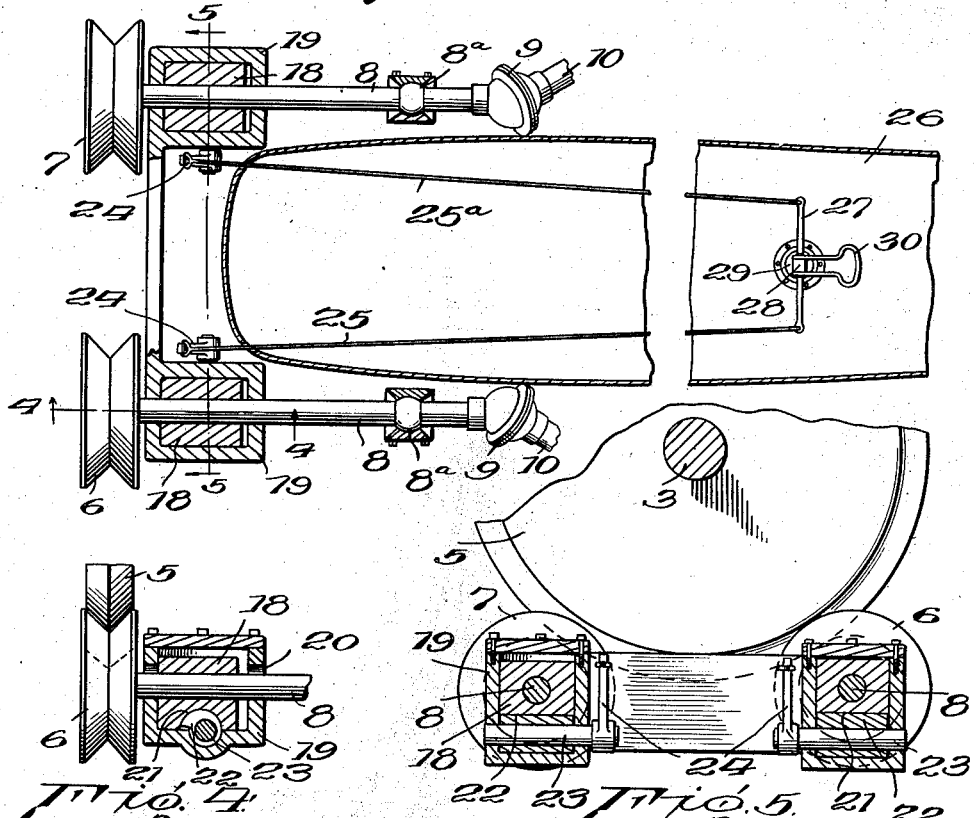
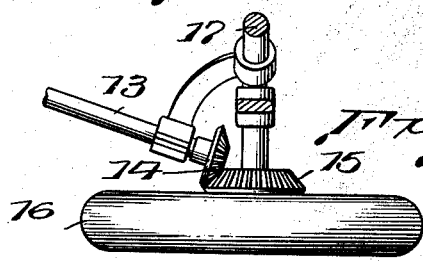
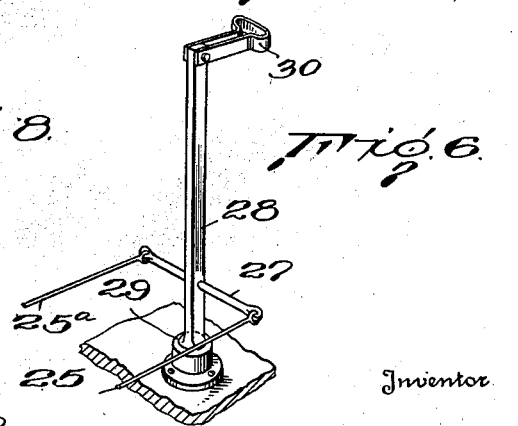
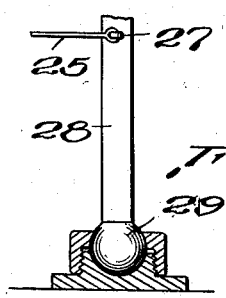
Inventor
Charles N. Pogue,
Attorney

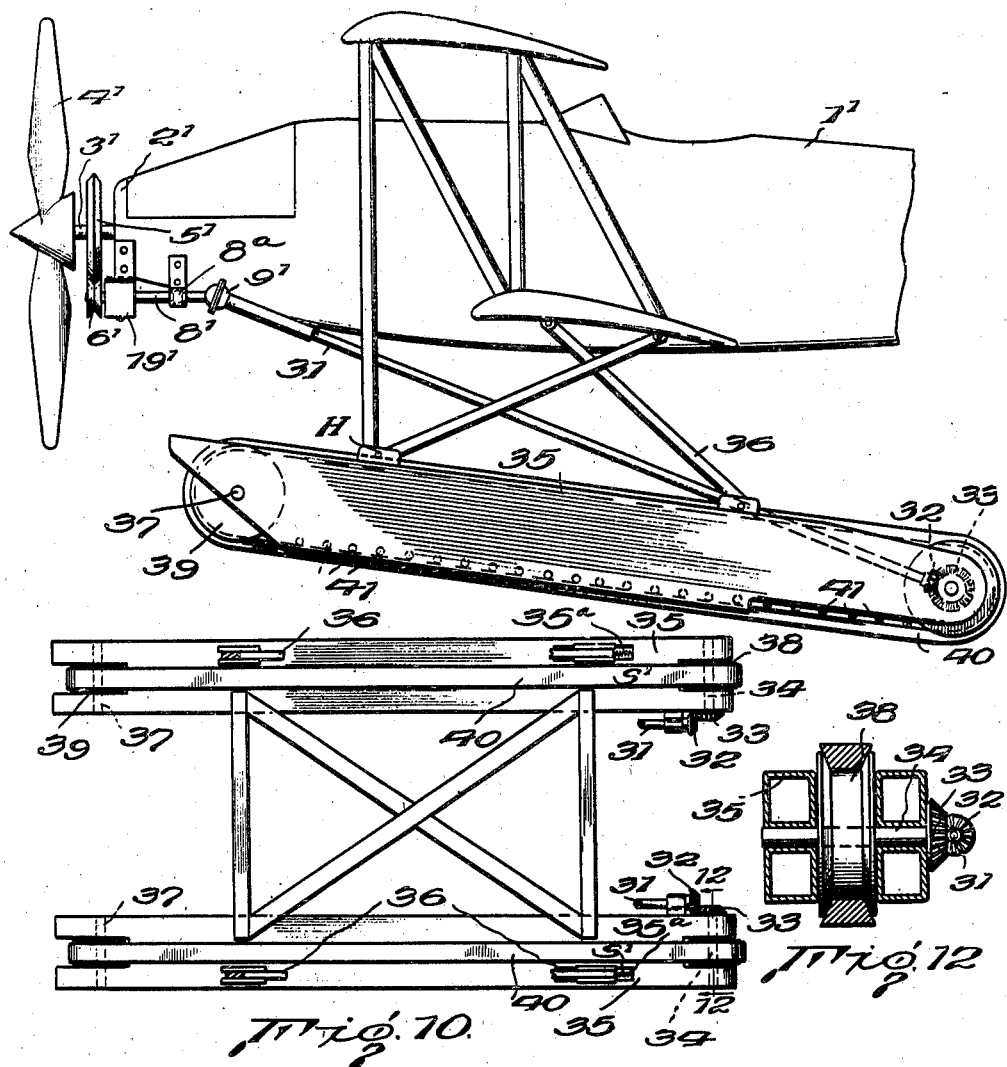

Patented Mar. 2, 1937

2,072,277

UNITED STATES PATENT OFFICE 2,072,277

AEROPLANE

Charles Nelson Pogue, Norwood, Winnepeg, Manitoba, Canada

Application March 2, 1935, Serial No. 9,090

2 Claims. (Cl. 244—50)

This invention relates to aeroplanes, and particularly to means for facilitating the taking off and landing of aeroplanes.

One of the drawbacks to a greater commercial development of the aviation industry has been the inability of aeroplanes to take off from the ground and land in a relatively small space. A ground speed of approximately sixty miles per hour is necessary before it is safe for the pilot to attempt to lift the plane into the air. If the aeroplane is a heavy one or if it carries a substantial load, a long run on the ground is necessary in order to attain such a minimum ground speed. Such long ground runs necessitate large fields, which in many instances has caused airports to be located at great distances from the metropolitan areas.

Also, the taking off and landing of aeroplanes in many instances is rendered difficult because of unfavorable weather conditions, or because of the condition of the ground from which the aeroplane is compelled to take off, or upon which it is necessary that it land.

With the above and other considerations in mind, it is proposed by the present invention to provide a landing gear for aeroplanes which may be used as a propelling and guiding means in the taking off of the aeroplane, and which may also be used to effect a much smoother landing, and to check the speed of the aeroplane after it has landed.

More particularly, the present invention relates to a landing gear which may be incorporated into aeroplanes during their initial construction, or which may be attached to existing aeroplanes without necessitating extensive alterations, and which comprises a pair of landing wheels or tractors with means for applying motive power, preferably from the engine or engines, to each wheel or tractor separately, so that they may be driven either simultaneously or independently of each other.

The provision of landing wheels which may be driven from the engine, enables the attainment of a rising ground speed in a very much shorter distance than has heretofore been possible, as the pulling power of the propeller is supplemented by the driving power of the wheels against the ground. Such supplementary action of the driven ground wheels is also of use when it is desired to move the aeroplane from one place to another while it is on the ground.

The provision of power driven ground wheels also enables the pilot to make a much smoother landing by eliminating the bouncing action normally caused by the inertia of the wheels as they strike the ground. If the wheels are being driven at a rate such that their peripheral speed is approximately the same as the speed of the aeroplane there will be substantially no inertia when the wheels touch the ground and, with all other things being equal, a much smoother landing will result.

The present invention also permits the means for transmitting power from the engine to the wheels to be utilized to check the speed of the aeroplane after it has landed, and thereby enables the aeroplane to come to a stop within a much shorter distance. If, just after the plane touches the ground, the pilot cuts off the engine and leaves the power transmitting mechanism to the wheels engaged, the wheels will transmit power back to the engine and the compression of air in the engine cylinders will act to check the speed of the plane in the same manner in which shifting the gears of an automobile into low gear will check its speed while going down hill.

The ability to apply power to each wheel independently of the other, and also simultaneously with the application of power to the propeller, facilitates the landing and taking off of the aeroplane, in that it provides a very simple and effective means for steering the aeroplane while it is traveling on land.

According to another embodiment of my invention, the landing gear is adapted for use on amphibian aeroplanes and comprises pontoons having independently driven tractor belts which enable the aeroplane to land on water or on soft or swampy land, and which, like the power driven wheels above referred to, may be used for steering and as a motivating force in moving the aeroplane from one place to another when the aeroplane is not in the air.

The invention will be described further in connection with the accompanying drawings, in which:

Fig. 1 is a side elevational view of the front portion of an aeroplane having landing wheels and embodying the present invention.

Fig. 2 is a front elevational view of Fig. 1.

Fig. 3 is a horizontal sectional view on line 3—3 of Fig. 1.

Fig. 4 is a sectional view on line 4—4 of Fig. 3.

Fig. 5 is a transverse sectional view on line 5—5 of Fig. 3.

Figs. 6 and 7 are detail views of means for controlling the transmission of power to the landing wheels.

Fig. 8 is a detail view showing the means for applying power to the landing wheels.

Fig. 9 is a view similar to Fig. 1 showing the invention applied to an amphibian aeroplane having landing pontoons and tractor belts.

Fig. 10 is a plan view of the pontoons shown in Fig. 9, with the supporting struts shown in section.

Fig. 11 is a cross sectional view through the lower portion of one of the pontoons.

Fig. 12 is a transverse sectional view on line 12—12 of Fig. 11, and

Fig. 13 is a detail view of means for securing the lower ends of the supporting struts to the rear ends of the pontoons shown in Figs. 9 and 10.

In the drawings, an aeroplane 1 of usual construction and having the usual controls is driven by an engine 2, located at the front thereof. A propeller shaft 3 is driven by the engine and protrudes from the front of the fuselage and carries a propeller 4 of any desired construction on the outer end thereof.

A relatively large driving gear 5, preferably of the friction type and having a V-shaped driving periphery, is rigidly mounted on the propeller shaft between the front end of the fuselage and the propeller 4. The gear 5 is the driving means for a pair of relatively smaller frictional gears 6 and 7 which have V-shaped driving peripheries complementary to the V-shaped periphery of the gear 5. The gears 5, 6, and 7 preferably are made of fiber or of some tough material having frictional surfaces.

Each of the gears 6 and 7 is mounted upon the outer end of a mounting and driving shaft 8, which at their opposite ends transmit power through universal joints 9 to a pair of telescoping power shafts 10 and 11. Self-aligning bearings 8a support the shafts 8 intermediate their lengths. Each power shaft 11 has a universal joint 12 at its lower end through which power is transmitted to shafts 13 for driving pinions 14 meshing with bevel gears 15 carried by each of the ground wheels 16 mounted on the lower ends of the usual struts 17. The usual shock absorbers 17a for the wheels 16 may be provided.

Each mounting and driving shaft 8 passes through a boxing 18 in a casing 19 having elongated openings 20 through which the shafts 8 pass. The boxings 18 are movable within the casings 19 to cause the gears 6 and 7 to engage or disengage with the gear 5. To cause movement of the boxings 18 in a direction to move the gears 6 and 7 into engagement with the gear 5, each boxing has a curved recess 21 in its lower side to receive an elongated cam 22 rigidly mounted upon a shaft 23. The inner ends of the shafts 23 have arms 24 extending therefrom to which operating cables 25 and 25a which extend into the cockpit 26 of the aeroplane are connected.

In the cockpit, the ends of the cables 25 and 25a are connected to the opposite ends of a rod 27 which passes through or is otherwise secured to an operating lever 28. The operating lever 28 is secured to the floor or framework of the cockpit by a universal connection 29 which permits it to be moved backward and forward to apply tension to both cables simultaneously, or to be turned about its longitudinal axis to apply tension to one or the other of the cables. A handle 30 is secured to the upper end of the lever 28 so that the lever may be manipulated readily by the pilot.

From the foregoing description it will be apparent that when the engine is running power may be applied to operate either or both of the ground wheels 16 simultaneously with the propeller.

If the pilot wants to take off and to make a straight run down the field and to use the driving power of the ground wheels to supplement the pulling power of the propeller, it is only necessary that he pull straight back on the lever 27. That applies tension simultaneously to each of the cables 25 and 25a, which through the arms 24 and shafts 23 cause the cams 22 to be rotated and to elevate the boxings 18 sufficiently to cause both of the gears 6 and 7 to be brought into driving engagement with the driving gear 5, which gears, in turn, transmit power through the shafts 8 and the power transmitting shafts 10, 11, and 13 to the wheels 16.

On the other hand, if the pilot desires to use the wheels for steering, and, for example, wants to turn towards the right, he will not pull straight back on the lever 28, but will rotate it about its longitudinal axis in a counter-clockwise direction. Such movement will apply tension to the left cable 25 and slacken the right cable 25a with the result that the right gear 7 will remain disengaged from the driving gear 5, but the left gear 6 will be lifted into driving engagement with the driving gear 5 and power applied to drive the left ground wheel 16 while the right ground wheel will remain free. The driving force of the left ground wheel against the ground while the right wheel rotates freely, will be sufficient to cause the plane to turn towards the right. If a left turn is desired it is only necessary that the pilot rotate the lever 28 in a clockwise direction to apply tension to the right cable 25a and to slacken the left cable 25 whereupon the right wheel will be driven while the left wheel is left free. Thus there is provided a very effective means of steering the aeroplane while it is on the ground.

If just prior to landing the pilot applies power to the ground wheels they will attain a peripheral speed of approximately the speed of the aeroplane and they will exert no inertia when the aeroplane touches the ground which will cause bouncing of the aeroplane and a rough landing.

If just after the wheels have touched the ground the pilot cuts off the engine the wheels will transmit power back to the engine and the engine will thereby be used to brake the speed of the aeroplane.

In Figs. 9 to 12 inclusive the invention is shown applied to an aeroplane equipped with pontoons and tractor belts which permit landing either on land or water. In these figures the aeroplane 1', has an engine 2', propeller shaft 3', and propeller 4', driving gear 5' and a pair of driveable gears, only one of which 6' is shown, the same as in Figs. 1 to 8 inclusive. As in the former embodiment of the invention the driveable gears are mounted on the outer end of a shiftable mounting and driving shaft 8' which is surrounded by a boxing in a casing 19'. The other end of each of the shafts 8' is connected through a universal joint 9' to a power transmitting shaft 31 which at its lower end carries a pinion 32 meshing with a bevel gear 33 mounted on the inner end of a driving axle 34 which extends transversely through the rear end of an upwardly inclined pontoon 35 carried by supporting struts 36 beneath the fuselage of the aeroplane. A similar, but non-driven axle 37 extends through the forward end of each pontoon 35. Mounted on each of the rear and forward axles 34 and 37 are pulleys 38 and 39 having generally V-shaped peripheries to receive correspondingly shaped tractor belts 40 of rubber or a rubber-like composition which extend around the pontoons in the direction of travel of the aeroplane.

The struts 36 are secured to the forward ends of the pontoons by means of a hinged connection H, while at the rear ends of the pontoons slidable connections between the lower ends of the struts and the pontoons are provided so that the pontoons may assume a sub-parallel position with respect to the fuselage when the pontoons are being used to move the aeroplane in land or water, and yet may be shifted to a forwardly inclined position when the aeroplane leaves the ground, so that when the aeroplane again lands the rear portion of the pontoons will touch the ground first.

As shown in Fig. 13, the lower ends of the struts 36 are provided with rollers 36a bearing on opposite sides of bars 36b located in recesses in the upper rear portion of the pontoons 35. Springs S and S' bear against opposite sides of the lower ends of the struts 36 and normally and resiliently hold the angular position of the pontoons as shown in Fig. 9. However, when the aeroplane lands the force exerted by the rear portions of the pontoons against the ground causes the lower ends of the struts to compress the rear springs S' and permit the pontoons to shift to a sub-parallel position with respect to the fuselage so that the aeroplane may be moved by means of the tractor belts while the fuselage is maintained in a sub-horizontal position.

The driving pulleys for the tractor belts are located at the rear of the pontoons because it gives a straighter angle of drive than if the driving pulleys were placed at the forward ends of pontoons.

The pontoons 35 are provided with a series of transversely extending rollers 41 adjacent the bottom surface thereof over which the lower flight of the tractor belts pass. The tractor belts are of a width of approximately one-third the width of the pontoons and of a thickness sufficient to support the bottoms of the pontoons slightly above the ground so that they will not scrape along the ground when the tractor belts are being used as a motivating force for the aeroplane.

The driveable gears for transmitting power to the tractor belts 40 are brought into driving engagement with the driving gear 5' by means of flexible cables in the same manner as has been described in connection with the former embodiment of the invention, and the manner of using the tractor belts for steering and as a motivating force for the aeroplane is the same as heretofore described. However, the use of the pontoons and tractor belts permits a safe landing to be made on water or on soft or swampy ground, and when such landings are necessary the tractor belts may be used to move the plane to a more desirable place.

As the ground-engaging elements may be used to exert a driving force against the ground which will supplement the pulling force of the propeller when taking off and may also be used to brake the speed of the aeroplane after it has landed, much smaller taking off and landing fields than are now necessary may be used with safety. Also, as the ground-engaging elements may be driven simultaneously with the propeller, and either ground-engaging element may be driven independently of the other, the present invention provides a more satisfactory manner of moving the aeroplane from one place to another when it is not in the air.

The invention has been described in connection with the two embodiments thereof shown in the drawings, but it is to be understood that they are merely used to exemplify the invention and that the same is not limited thereto except as may be pointed out in the subjoined claims.

I claim:

1. In an aeroplane, a propeller, a source of power, a propeller shaft for transmitting power from said source of power to said propeller, a driving gear driven from said propeller shaft, a pair of driveable gears, a driving and mounting shaft for each of said driveable gears, means for transmitting power from each of said driving and mounting shafts to one of the ground-engaging elements, and means operable by the pilot for bodily shifting said driving and mounting shafts independently of one another for causing either or both of said driveable gears to be brought into driving engagement with said driving gear, whereby either or both of said ground-engaging elements may be driven simultaneously with the propeller.

2. In an aeroplane, a propeller, a source of power, a propeller shaft for transmitting power from said source of power to said propeller, a driving gear driven from said propeller shaft, a pair of driveable gears, a driving and mounting shaft for each of said driveable gears, means for transmitting power from each of said driving and mounting shafts to one of the ground-engaging elements, a boxing for each of said driving and mounting shafts, a cam for bodily shifting each boxing to move its driving and mounting shaft into engagement with the driving gear, and an operating cable for each cam extending to the pilot's cabin, whereby either or both of said ground-engaging elements may be driven simultaneously with the propeller.

CHARLES NELSON POGUE.